(12) United States Patent
Park

(10) Patent No.: US 8,801,557 B2
(45) Date of Patent: Aug. 12, 2014

(54) HYBRID TRANSMISSION

(75) Inventor: Jong Sool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/532,516

(22) Filed: Jun. 25, 2012

(65) Prior Publication Data

US 2013/0150196 A1  Jun. 13, 2013

(30) Foreign Application Priority Data

Dec. 9, 2011  (KR) .................. 10-2011-0131882

(51) Int. Cl.
*F16H 3/72*  (2006.01)
(52) U.S. Cl.
USPC ........................................................ 475/5
(58) Field of Classification Search
None
See application file for complete search history.

(56) References Cited

U.S. PATENT DOCUMENTS

| | | | |
|---|---|---|---|
| 8,162,084 B2 * | 4/2012 | Iwanaka et al. | 180/65.235 |
| 8,435,147 B2 * | 5/2013 | Kim et al. | 475/5 |
| 8,465,386 B2 * | 6/2013 | Kersting | 475/5 |
| 2009/0275439 A1 * | 11/2009 | Kersting | 475/5 |

* cited by examiner

*Primary Examiner* — Dirk Wright
(74) *Attorney, Agent, or Firm* — Morgan, Lewis & Bockius LLP

(57) ABSTRACT

A hybrid transmission includes a first planetary gear set and a second planetary gear set. The first planetary gear set is constituted of a complex planetary gear train connected to an input element, a motor/generator, and a first clutch, and has four or more rotation elements. The first rotation element of the first planetary gear set is selectively connected to the input element and the first clutch is installed to selectively stop rotation of a third rotation element of the first planetary gear set. The fourth rotation element of the first planetary set is selectively connected to the motor/generator. The second planetary gear set is connected to an output element, and has four or more rotation elements.

14 Claims, 22 Drawing Sheets

*Fig. 4*

|  | CL1 | CL2 | CL3 | CL4 | CL5 | CL6 | Remarks |
|---|---|---|---|---|---|---|---|
| R | ● | ● |  |  | ● |  |  |
| Launching (R) |  | ● |  |  | ● |  | MG launching control |
| N |  | ● |  |  |  |  |  |
| Charging (N) | ● | (●) |  |  |  |  | N gear stage charging (Generating control) |
| Launching (D) |  | ● |  |  |  | ● | MG launching control |
| D1 | ● | ● |  |  |  | ● | MG torque assistant |
| D2 | ● |  | ● |  |  | ● |  |
| D3 | ● |  |  |  | ● | ● |  |
| D4 | ● |  |  | ● |  | ● |  |
| D5 | ● |  |  | ● | ● |  |  |
| D6 | ● |  | ● | ● |  |  |  |
| Braking | ● | - | - | - | - | - | Enable MG generating control in all gear stages during activation of CL1 |

*Fig. 7*

| | CL1 | CL2 | CL3 | CL4 | CL5 | CL6 | Remarks |
|---|---|---|---|---|---|---|---|
| R | ● | ● | | | ● | | |
| Launching (R) | | ● | | | ● | | MG launching control |
| N | | ● | | | | | |
| Charging (N) | ● | (●) | | | | | N gear stage charging (Generating control) |
| Launching (D) | | ● | | | | ● | MG launching control |
| D1 | ● | ● | | | | ● | MG torque assistant |
| D2 | ● | | ● | | | ● | |
| D3 | ● | | | | ● | ● | |
| D4 | ● | | | ● | | ● | |
| D5 | ● | | | ● | ● | | |
| D6 | ● | | ● | ● | | | |
| Braking | ● | – | – | – | – | – | Enable MG generating control in all gear stages during activation of CL1 |

Fig. 10

|  | CL1 | CL2 | CL3 | CL4 | CL5 | CL6 | CL7 | Remarks |
|---|---|---|---|---|---|---|---|---|
| R |  | ● |  |  | ● |  |  |  |
| Launching (R) |  | ● |  |  | ● |  |  | MG launching control |
| N |  | ● |  |  |  |  |  |  |
| Charging (N) | ● | (●) |  |  |  |  |  | N gear stage charging (Generating control) |
| Launching (D) |  | ● |  |  |  | ● |  | MG launching control |
| D1 | ● | ● |  |  |  | ● |  | MG torque assistant |
| D2 | ● |  | ● |  |  | ● |  |  |
| D3 | ● |  |  |  | ● | ● |  |  |
| D4 | ● |  |  |  |  | ● | ● |  |
| D5 | ● |  |  | ● |  | ● |  |  |
| D6 | ● |  |  | ● |  |  | ● |  |
| D7 | ● |  |  | ● | ● |  |  |  |
| D8 | ● |  | ● | ● |  |  |  |  |
| Braking | ● | − | − | − | − | − | − | Enable MG generating control in all gear stages during activation of CL1 |

Fig. 13

|  | CL1 | CL2 | CL3 | CL4 | CL5 | CL6 | CL7 | Remarks |
|---|---|---|---|---|---|---|---|---|
| R | ● | ● |  |  | ● |  |  |  |
| Launching (R) |  | ● |  |  | ● |  |  | MG launching control |
| N |  | ● |  |  |  |  |  |  |
| Charging (N) | ● | (●) |  |  |  |  |  | N gear stage charging (Generating control) |
| Launching (D) |  | ● |  |  |  | ● |  | MG launching control |
| D1 | ● | ● |  |  |  | ● |  | MG torque assistant |
| D2 | ● |  | ● |  |  | ● |  |  |
| D3 | ● |  |  |  | ● | ● |  |  |
| D4 | ● |  |  |  |  | ● | ● |  |
| D5 | ● |  |  | ● |  | ● |  |  |
| D6 | ● |  |  | ● |  |  | ● |  |
| D7 | ● |  |  | ● | ● |  |  |  |
| D8 | ● |  | ● | ● |  |  |  |  |
| Braking | ● | – | – | – | – | – | – | Enable MG generating control in all gear stages during activation of CL1 |

HYBRID TRANSMISSION

CROSS-REFERENCE TO RELATED APPLICATIONS

The present application claims priority of Korean Patent Application Number 10-2011-0131882 filed on Dec. 9, 2011, the entire contents of which application is incorporated herein for all purposes by this reference.

BACKGROUND OF INVENTION

1. Field of Invention

The present invention relates, in general, to a hybrid transmission, and more particularly, to a structure of a transmission adapted to transfer power from each of an engine and a motor to driving wheels.

2. Description of Related Art

In general, hybrid vehicles are vehicles using two or more energy sources and are mostly used in a combination of an existing engine using fossil fuels and at least one motor using electrical energy, although various other methods may be used depending on the combination of many energy sources.

Depending on whether the engine and/or the motor is operated, the hybrid vehicles can realize an electric vehicle (EV) mode driven by only the motor, a hybrid electric vehicle (HEV) mode driven by both the engine and the motor, and an engine-only mode driven by only the engine. Also, the hybrid vehicle can operate a generator using kinetic energy in the vehicle instead of wasting energies in conventional friction braking during an idle stop and during deceleration of the vehicle. Therefore, compared to conventional vehicles, hybrid vehicles can enhance the fuel efficiency by reducing the fuel consumption through regenerative braking, in which the generated electric energy is stored in a battery and then reused for driving the vehicle or the like.

A variety of hybrid transmissions are used in such hybrid vehicles, among them is a transmission using only a single motor as shown in FIG. 1.

Specifically, an automatic transmission 500, in which a conventional torque converter is eliminated, is connected to an engine 504 via a friction clutch 502, and a motor 506 is connected to an input shaft of the automatic transmission 500. Alternatively, the automatic transmission 500 may be replaced with a conventional continuously variable transmission (CVT) and the like.

In the hybrid transmission as described above, the EV mode driving can be carried out using the motor 506 during a vehicle launch, and then at a vehicle speed higher than a predetermined value, the engine 504 is started and the friction clutch 502 is engaged such that the acceleration ability and the fuel efficiency can be enhanced through a torque distribution between the engine 504 and the motor 506. Also, during braking, the braking energy can be recovered as electric energy through the motor 506, leading to enhancement of the fuel efficiency. In addition, since only one motor is used in contrast to other conventional hybrid transmission structures using two motors, an obvious advantage can be achieved in terms of cost-savings.

However, hybrid transmissions having such a structure experience some problems. For example, an impact can be caused when the clutch is engaged after starting of the engine. Also, when a charged amount of the battery is insufficient or a capacity of the motor is small, namely when low-speed hill climbing using the engine torque is required continuously, performance of the hybrid transmissions can be degraded. Performance degradation includes an impact due to a slip of the clutch, instability of speed control, or a thermal deterioration of the clutch. In addition, since an input shaft for the engine power and an input shaft for the motor power are identical, utilization of an optimal efficiency operating point of the motor, in which the motor has a number of revolutions per minute higher than those of the engine, can be restricted and thus enhancement of the fuel efficiency cannot be sufficiently realized.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present application are directed to provide a hybrid transmission having a single motor without a torque converter to reduce costs. The motor can be utilized to provide a smooth start of a vehicle and also to generate electricity. Slips caused by the torque converter and a friction clutch can be eliminated. The regenerative braking can be performed to enhance the fuel efficiency of the vehicle. A torque assistant during acceleration can be performed by the motor to enhance the drivability of the vehicle. A power input path from the engine and a power input path from the motor can be set differently from each other to utilize the optimal efficiency operating point of the motor without being limited to a certain number of revolutions per minute of the engine, leading to maximization of the fuel efficiency.

Various aspects of the present application are directed to provide a hybrid transmission that includes: a first planetary gear set constituted of a complex planetary gear train connected to an input element, a motor/generator, and a first clutch, and having four or more rotation elements; and a second planetary gear set connected to an output element (OUTPUT) and having four or more rotation elements, wherein a first rotation element of the first planetary gear set is normally or selectively connected to the input element, the first clutch is installed to selectively stop rotation of a third rotation element of the first planetary gear set (PGS1), and a fourth rotation element of the first planetary set (PGS1) is normally or selectively connected to the motor/generator (MG).

A second rotation element of the first planetary gear set (PGS1) may be selectively connected to two or more rotation elements of the second planetary gear set (PGS2) that are not selectively connected to the output element (OUTPUT). A second rotation element of the first planetary gear set (PGS1) may be selectively connected via clutches to two or more rotation elements of the second planetary gear set (PGS2) that are not selectively connected to the output element (OUTPUT).

A first rotation element of the second planetary gear set (PGS2) may be selectively connected to a second rotation element of the first planetary gear set (PGS1) via a sixth clutch (CL6); a second rotation element of the second planetary gear set (PGS2) is selectively connected to the output element (OUTPUT); a third rotation element of the second planetary gear set (PGS2) is selectively connected to the input element (INPUT) and a transmission case via a fourth clutch (CL4) and a second clutch (CL2); and a fourth rotation element of the second planetary gear set (PGS2) is selectively connected to the second rotation element of the first planetary gear set (PGS1) and the transmission case via a fifth clutch (CL5) and a third clutch (CL3).

The first planetary gear set (PGS1) may be constituted by combining a first single pinion planetary gear train (PS1) and a second single pinion planetary gear train (PS2); rotation elements of the first single pinion planetary gear train (PS1) include a first sun gear (S1), a first carrier (C1), and a first ring gear (R1); rotation elements of the second single pinion planetary gear train (PS2) include a second sun gear (S2), a second carrier (C2), and a second ring gear (R2); the second ring gear (R2) constitutes the first rotation element of the first planetary gear set (PGS1); the first ring gear (R1) is selectively connected to the second carrier (C2) and constitutes the second rotation element of the first planetary gear set (PGS1); the first carrier (C1) is selectively connected to the second sun gear (S2) and constitutes the third rotation element of the first planetary gear set (PGS1); and the first sun gear (S1) constitutes the fourth rotation element of the first planetary gear set (PGS1).

The rotation elements of the second planetary gear set (PGS2) may include a third sun gear (S3), a fourth sun gear (S4), third and fourth carriers (C3, C4), and third and fourth ring gears (R3, R4); the fourth sun gear (S4) constitutes the first rotation element of the second planetary gear set (PGS2); the third and fourth ring gears (R3, R4) constitute the second rotation element of the second planetary gear set (PGS2); the third and fourth carriers (C3, C4) constitute the third rotation element of the second planetary gear set (PGS2); and the third sun gear (S3) constitutes the fourth rotation element of the second planetary gear set (PGS2).

The first planetary gear set (PGS1) may be constituted by combining a first single pinion planetary gear train (PS1) and a second single pinion planetary gear train (PS2); rotation elements of the first single pinion planetary gear train (PS1) include a first sun gear (S1), a first carrier (C1), and a first ring gear (R1); rotation elements of the second single pinion planetary gear train (PS2) include a second sun gear (S2), a second carrier (C2), and a second ring gear (R2); the first ring gear (R1) is selectively connected to the second ring gear (R2) and constitutes the first rotation element of the first planetary gear set (PGS1); the second carrier (C2) constitutes the second rotation element of the first planetary gear set (PGS1); the first carrier (C1) is selectively connected to the second sun gear (S2) and constitutes the third rotation element of the first planetary gear set (PGS1); and the first sun gear (S1) constitutes the fourth rotation element of the first planetary gear set (PGS1).

The rotation elements of the second planetary gear set (PGS2) may include a third sun gear (S3), a fourth sun gear (S4), third and fourth carriers (C3, C4), and third and fourth ring gears (R3, R4); the fourth sun gear (S4) constitutes the first rotation element of the second planetary gear set (PGS2); the third and fourth ring gears (R3, R4) constitute the second rotation element of the second planetary gear set (PGS2); the third and fourth carriers (C3, C4) constitute the third rotation element of the second planetary gear set (PGS2); and the third sun gear (S3) constitutes the fourth rotation element of the second planetary gear set (PGS2).

A first rotation element of the second planetary gear set (PGS2) may be selectively connected to a second rotation element of the first planetary gear set (PGS1) via a sixth clutch (CL6); a second rotation element of the second planetary gear set (PGS2) is selectively connected to the output element (OUTPUT); a third rotation element of the second planetary gear set (PGS2) is selectively connected to the input element (INPUT) and a transmission case via a fourth clutch (CL4) and a second clutch (CL2); and a fourth rotation element of the second planetary gear set (PGS2) is selectively connected to the input element (INPUT), the second rotation element of the first planetary gear set (PGS1), and the transmission case, via a seventh clutch (CL7), a fifth clutch (CL5), and a third clutch (CL3).

The first planetary gear set (PGS1) may be constituted by combining a first single pinion planetary gear train (PS1) and a second double pinion planetary gear train (PD2); rotation elements of the first single pinion planetary gear train (PS1) include a first sun gear (S1), a first carrier (C1), and a first ring gear (R1); rotation elements of the second double pinion planetary gear train (PD2) include a second sun gear (S2), a second carrier (C2), and a second ring gear (R2); the first ring gear (R1) is selectively connected to the second carrier (C2) and constitutes the first rotation element of the first planetary gear set (PGS1); the second ring gear (R2) constitutes the second rotation element of the first planetary gear set (PGS1); the first carrier (C1) is selectively connected to the second sun gear (S2) and constitutes the third rotation element of the first planetary gear set (PGS1); and the first sun gear (S1) constitutes the fourth rotation element of the first planetary gear set (PGS1).

The rotation elements of the second planetary gear set (PGS2) may include a third sun gear (S3), a fourth sun gear (S4), third and fourth carriers (C3, C4), and third and fourth ring gears (R3, R4); the fourth sun gear (S4) constitutes the first rotation element of the second planetary gear set (PGS2); the third and fourth ring gears (R3, R4) constitute the second rotation element of the second planetary gear set (PGS2); the third and fourth carriers (C3, C4) constitute the third rotation element of the second planetary gear set (PGS2); and the third sun gear (S3) constitutes the fourth rotation element of the second planetary gear set (PGS2).

A first rotation element of the second planetary gear set (PGS2) may be selectively connected to a second rotation element of the first planetary gear set (PGS1) and selectively connected to a fifth rotation element of the second planetary gear set (PGS2) via a fifth clutch (CL5); a second rotation element of the second planetary gear set (PGS2) is selectively connected to the output element (OUTPUT); a third rotation element of the second planetary gear set (PGS2) is selectively connected to the input element (INPUT) and a transmission case via a fourth clutch (CL4) and a second clutch (CL2); a fourth rotation element of the second planetary gear set (PGS2) is selectively connected to the fifth rotation element of the second planetary gear set (PGS2) via a sixth clutch (CL6); and a fifth rotation element of the second planetary gear set (PGS2) is selectively connected to the first rotation element of the first planetary gear set (PGS1) via a seventh clutch (CL7), the first rotation element of the second planetary gear set (PGS2) via the fifth clutch (CL5), the fourth rotation element of the second planetary gear set (PGS2) via the sixth clutch (CL6), and the transmission case via a third clutch (CL3), wherein the first rotation element of the first planetary gear set (PGS1) is selectively connected to the input element (INPUT) and the first rotation element of the second planetary gear set (PGS2) is selectively connected to the second rotation element of the first planetary gear set (PGS1).

The first planetary gear set (PGS1) may be constituted by combining a first single pinion planetary gear train (PS1) and a second double pinion planetary gear train (PD2); rotation elements of the first single pinion planetary gear train (PS1) include a first sun gear (S1), a first carrier (C1), and a first ring gear (R1); rotation elements of the second double pinion planetary gear train (PD2) include a second sun gear (S2), a second carrier (C2), and a second ring gear (R2); the first ring gear (R1) is selectively connected to the second carrier (C2) and constitutes the first rotation element of the first planetary gear set (PGS1); the second ring gear (R2) constitutes the second rotation element of the first planetary gear set (PGS1); the first carrier (C1) is selectively connected to the second sun gear (S2) and constitutes the third rotation element of the first planetary gear set (PGS1); and the first sun gear (S1) constitutes the fourth rotation element of the first planetary gear set (PGS1).

The second planetary gear set (PGS2) may be constituted by combining a third double pinion planetary gear train (PD3) and a fourth single pinion planetary gear train (PS4); rotation elements of the third double pinion planetary gear train (PD3) include a third sun gear (S3), a third carrier (C3), and a third ring gear (R3); rotation elements of the fourth single pinion planetary gear train (PS4) include a fourth sun gear (S4), a fourth carrier (C4), and a fourth ring gear (R4); the third sun gear (S3) constitutes the first rotation element of the second planetary gear set (PGS2); the fourth ring gear (R4) constitutes the second rotation element of the second planetary gear set (PGS2); the third ring gear (R3) is selectively connected to the fourth carrier (C4) and constitutes the third rotation element of the second planetary gear set (PGS2); the third carrier (C3) constitutes the fourth rotation element of the second planetary gear set (PGS2); and the fourth sun gear (S4) constitutes the fifth rotation element of the second planetary gear set (PGS2).

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 provides an operation mode table of the hybrid transmission of FIG. 2.

FIG. 7 provides an operation mode table of the hybrid transmission of FIG. 5.

FIG. 10 provides an operation mode table of hybrid transmission of FIG. 8.

FIG. 13 provides an operation mode table of the hybrid transmission of FIG. 11.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 2 to 13, various embodiments of a hybrid transmission of the present application have a common configuration. This common configuration includes a first planetary gear set PGS1 and a second planetary gear set PGS2. The first planetary gear set PGS1 is constituted of a complex planetary gear train connected to an input element INPUT, a motor/generator MG, and a first clutch CL1, and has four or more rotation elements. The second planetary gear set PGS2 is connected to an output element OUTPUT and has four or more rotation elements. A first rotation element of the first planetary gear set PGS1 is normally or selectively connected to the input element INPUT, the first clutch CL1 is installed to selectively stop rotation of a third rotation element of the first planetary gear set PGS1, and a fourth rotation element of the first planetary set PGS1 is normally or selectively connected to the motor/generator MG. That is, the first clutch CL1 is connected and installed to a transmission case to perform substantially a function of a brake.

Common in some embodiments, a second rotation element of the first planetary gear set PGS1 is selectively connected, for example via clutches, to two or more rotation elements of the second planetary gear set PGS2 that are not normally connected to the output element OUTPUT.

Figure 1:
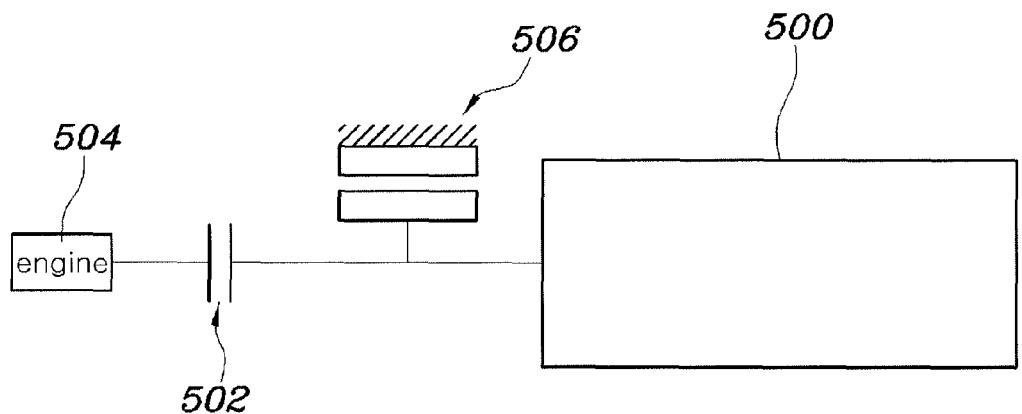
FIG. 1 is a view that explains a structure of a hybrid transmission according to the related art.
Figure 2:
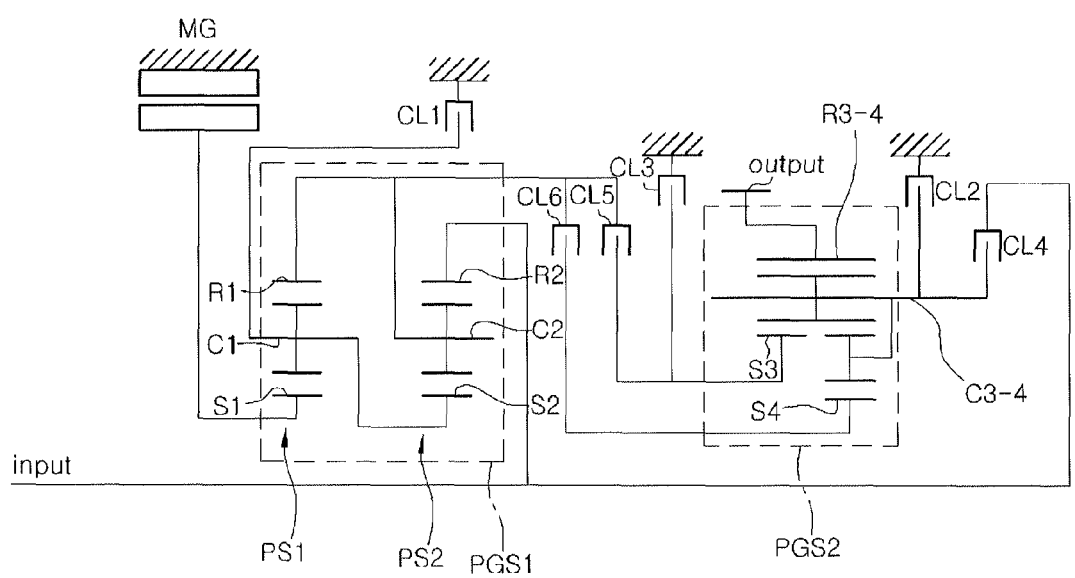
FIG. 2 shows an exemplary hybrid transmission according to the present application.
Figure 3:
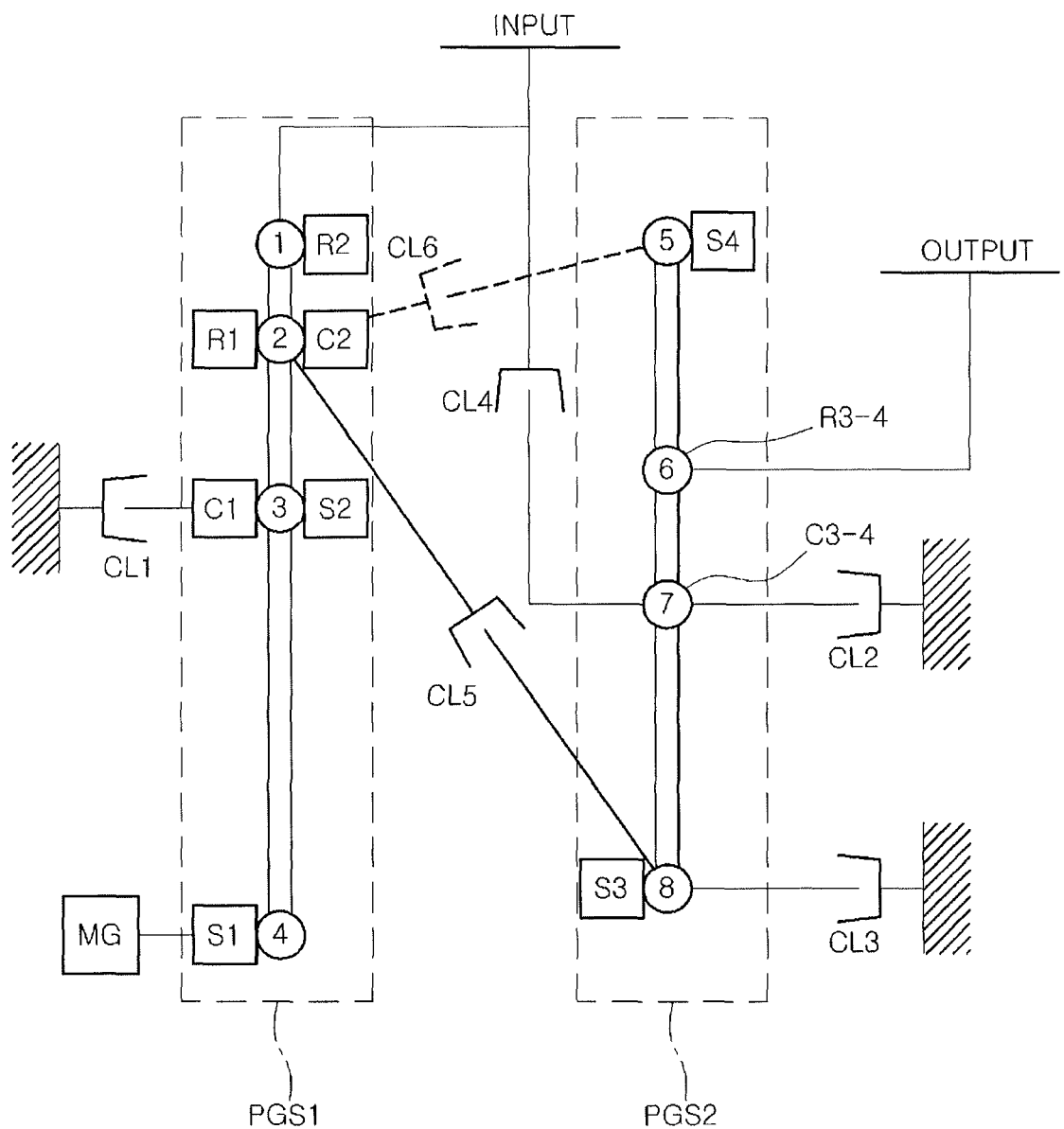
FIG. 3 depicts the hybrid transmission of FIG. 2 as a lever diagram.

In the illustrated embodiment of FIGS. 2 and 3, a first rotation element of the second planetary gear set PGS2 is selectively connected to the second rotation element of the first planetary gear set PGS1 via a sixth clutch CL6. A second rotation element of the second planetary gear set PGS2 is normally or selectively connected to the output element OUTPUT. A third rotation element of the second planetary gear set PGS2 is selectively connected to the input element INPUT and the transmission case via a fourth clutch CL4 and a second clutch CL2. And a fourth rotation element of the second planetary gear set PGS2 is selectively connected to the second rotation element of the first planetary gear set PGS1 and the transmission case via a fifth clutch CL5 and a third clutch CL3.

The first planetary gear set PGS1 is constituted by combining a first single pinion planetary gear train PS1 and a second single pinion planetary gear train PS2. Rotation elements of the first single pinion planetary gear train PS1 include a first sun gear S1, a first carrier C1, and a first ring gear R1, and rotation elements of the second single pinion planetary gear train PS2 include a second sun gear S2, a second carrier C2, and a second ring gear R2. The second ring gear R2 constitutes the first rotation element of the first planetary gear set PGS1. The first ring gear R1 is normally or selectively connected to the second carrier C2 and constitutes the second rotation element of the first planetary gear set PGS1. The first carrier C1 is normally or selectively connected to the second sun gear S2 and constitutes the third rotation element of the first planetary gear set PGS1. And the first sun gear S1 constitutes the fourth rotation element of the first planetary gear set PGS1.

In addition, the rotation elements of the second planetary gear set PGS2 include a third sun gear S3, a fourth sun gear S4, third and fourth carriers C3 and C4, and third and fourth ring gears R3 and R4. The fourth sun gear S4 constitutes the first rotation element of the second planetary gear set PGS2, the third and fourth ring gears R3 and R4 constitute the second rotation element of the second planetary gear set PGS2, the third and fourth carriers C3 and C4 constitute the third rotation element of the second planetary gear set PGS2, and the third sun gear S3 constitutes the fourth rotation element of the second planetary gear set PGS2. Thus, the second planetary gear set PGS2 as described above constitutes substantially a Ravigneaux type planetary gear set.

Specifically, the input element INPUT is normally or selectively connected to the second ring gear R2 and selectively connected to the third and fourth carriers C3 and C4 via the fourth clutch CL4. The motor/generator MG is normally or selectively connected to the first sun gear S1. The first clutch CL1 is designed to enable fixing of the first carrier C1 and the second sun gear S2. The first ring gear R1 and the second carrier C2 are connected to the third sung gear S3 via the fifth clutch CL5 and connected to the fourth sun gear S4 via the sixth clutch CL6. The second clutch CL2 is designed to enable fixing of the third and fourth carriers C3 and C4, and the third clutch CL3 is designed to enable fixing of the third sun gear S3. The output element OUTPUT is connected to the third and fourth ring gears R3 and R4.

FIG. 4 shows operation mode table of various embodiments configured as described above.

Figure 5:
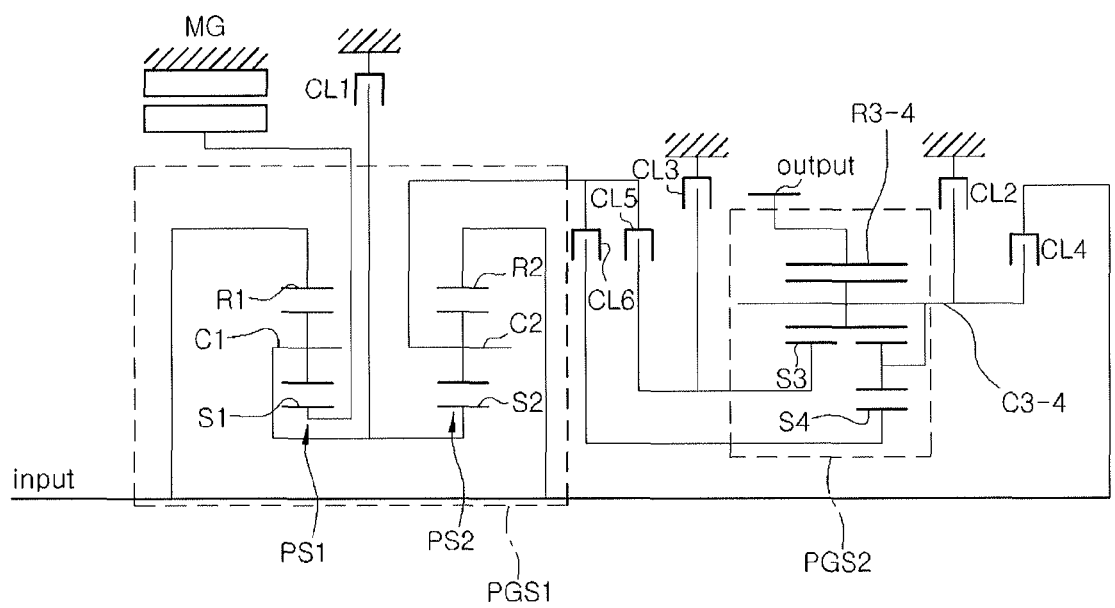
FIG. 5 shows an exemplary hybrid transmission according to the present application.
Figure 6:
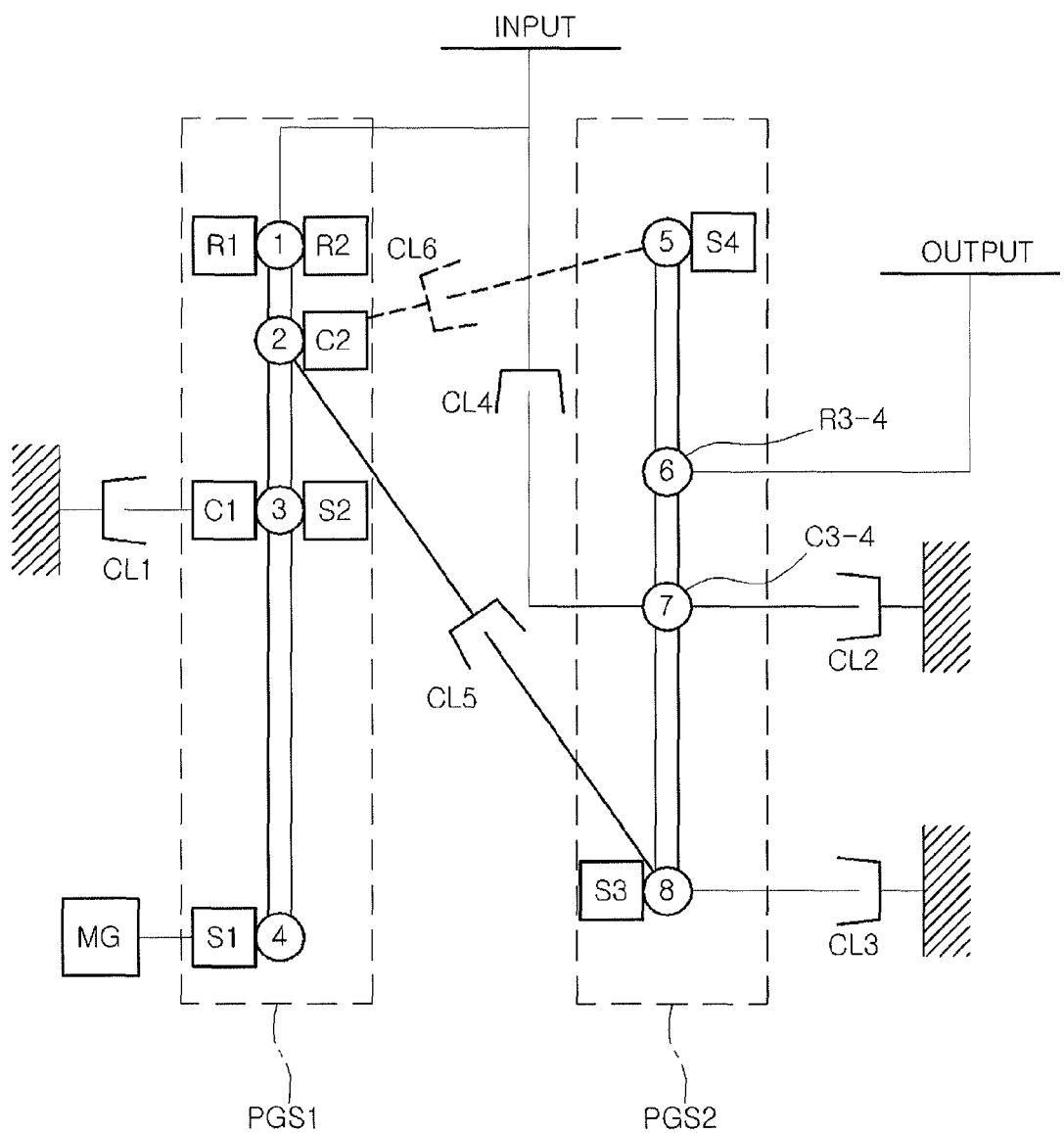
FIG. 6 depicts the hybrid transmission of FIG. 5 as a lever diagram.

Referring to FIGS. 5 and 6, according to various embodiments of the present application, the first planetary gear set PGS1 is constituted by combining a first single pinion planetary gear train PS1 and a second single pinion planetary gear train PS2. Rotation elements of the first single pinion planetary gear train PS1 include a first sun gear S1, a first carrier C1, and a first ring gear R1, and rotation elements of the second single pinion planetary gear train PS2 include a second sun gear S2, a second carrier C2, and a second ring gear R2. The first ring gear R1 is normally or selectively connected to the second ring gear R2 and constitutes the first rotation element of the first planetary gear set PGS1, the second carrier C2 constitutes the second rotation element of the first planetary gear set PGS1, the first carrier C1 is normally or selectively connected to the second sun gear S2 and constitutes the third rotation element of the first planetary gear set PGS1, and the first sun gear S1 constitutes the fourth rotation element of the first planetary gear set PGS1.

Also, the rotation elements of the second planetary gear set PGS2 include a third sun gear S3, a fourth sun gear S4, third and fourth carriers C3 and C4, and third and fourth ring gears R3 and R4. The fourth sun gear S4 constitutes the first rotation element of the second planetary gear set PGS2, the third and fourth ring gears R3 and R4 constitute the second rotation element of the second planetary gear set PGS2, the third and fourth carriers C3 and C4 constitute the third rotation element of the second planetary gear set PGS2, and the third sun gear S3 constitutes the fourth rotation element of the second planetary gear set PGS2. Thus, the second planetary gear set PGS2 as described above constitutes substantially a Ravigneaux type planetary gear train.

That is, the present embodiment is substantially similar to that described above except that configurations and thus connection relations of the first planetary gear set PGS1 of the present embodiment are different from those described above.

FIG. 7 shows an operation mode table of various embodiments configured as described above.

Figure 8:
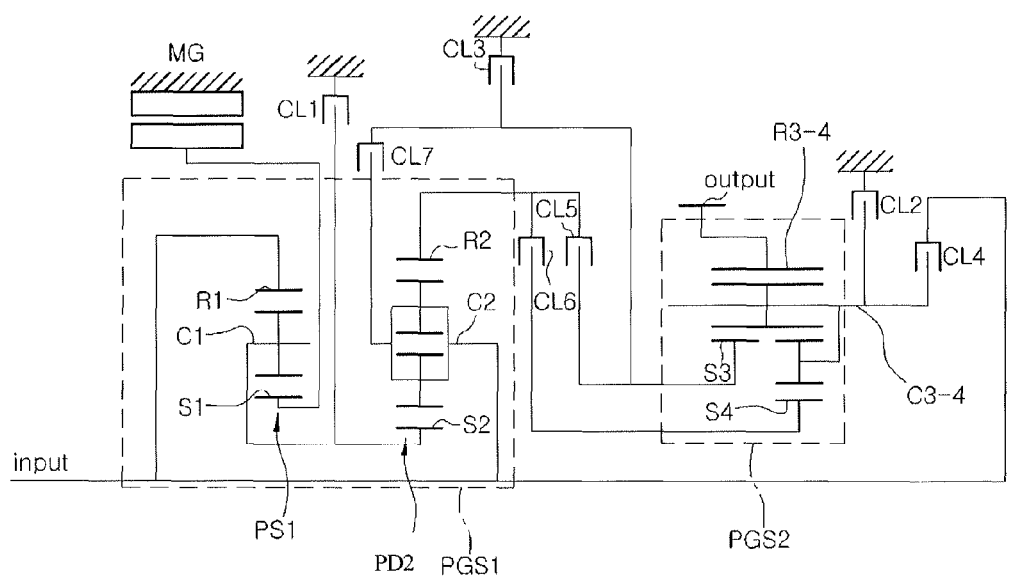
FIG. 8 shows an exemplary hybrid transmission according to the present application.
Figure 9:
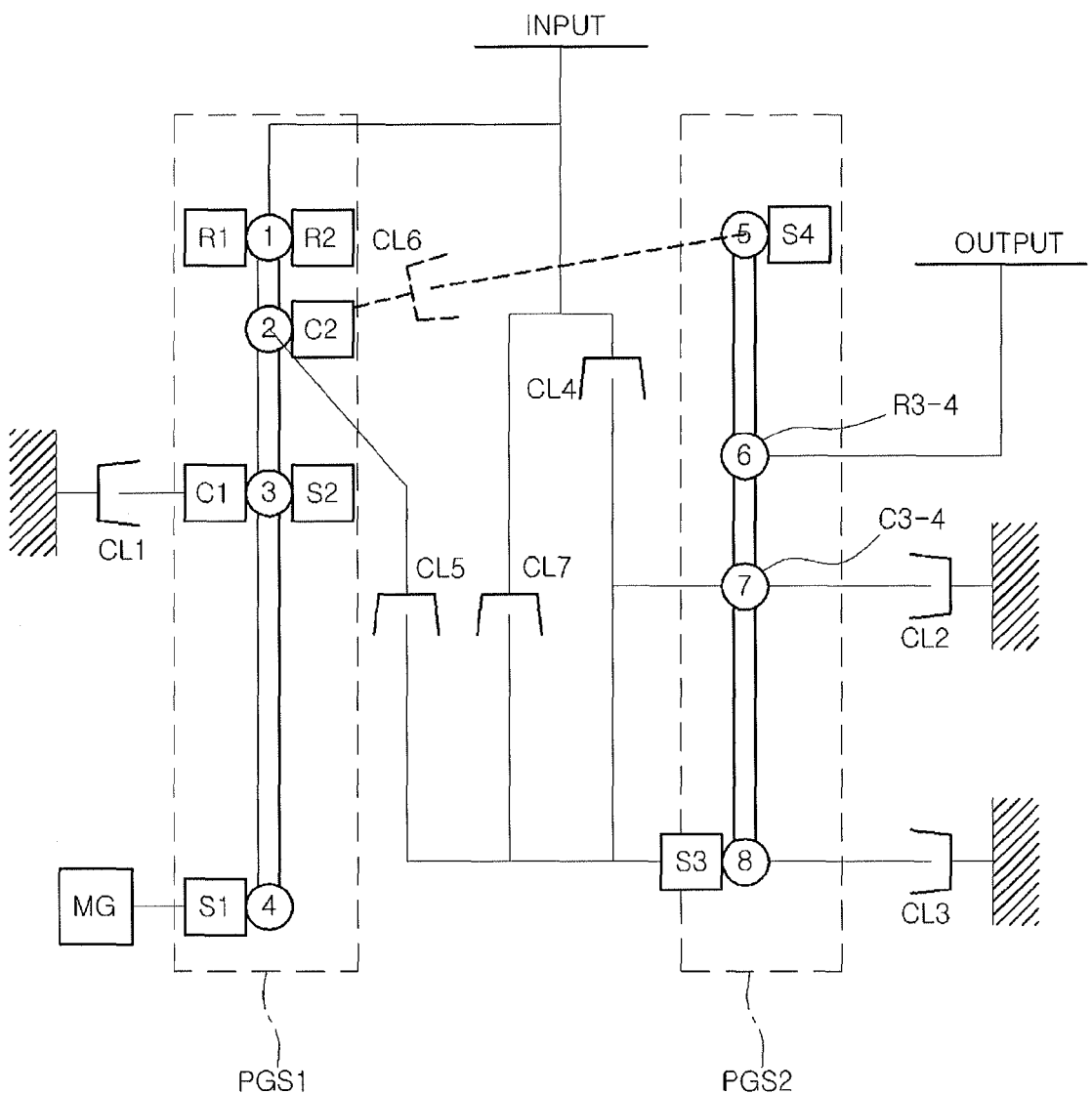
FIG. 9 depicts the hybrid transmission of FIG. 8 as a lever diagram.

In FIGS. 8 and 9, the structure of various embodiments according to the present application is shown. In addition to the common configuration as described above, the present embodiment comprises other features, for example, a first rotation element of the second planetary gear set PGS2 is selectively connected to the second rotation element of the first planetary gear set PGS1 via a sixth clutch CL6. A second rotation element of the second planetary gear set PGS2 is normally or selectively connected to the output element OUTPUT. A third rotation element of the second planetary gear set PGS2 is selectively connected to the input element INPUT and the transmission case via a fourth clutch CL4 and a second clutch CL2. And a fourth rotation element of the second planetary gear set PGS2 is selectively connected to the input element INPUT via a seventh clutch CL7, the second rotation element of the first planetary gear set PGS1 via a fifth clutch CL5, and the transmission case via a third clutch CL3.

Here, the first planetary gear set PGS1 is constituted by combining a first single pinion planetary gear train PS1 and a second double pinion planetary gear train PD2. Rotation elements of the first single pinion planetary gear train PS1 include a first sun gear S1, a first carrier C1, and a first ring gear R1, and rotation elements of the second double pinion planetary gear train PD2 include a second sun gear S2, a second carrier C2, and a second ring gear R2. The first ring gear R1 is normally or selectively connected to the second carrier C2 and constitutes the first rotation element of the first planetary gear set PGS1, the second ring gear R2 constitutes the second rotation element of the first planetary gear set PGS1, the first carrier C1 is normally or selectively connected to the second sun gear S2 and constitutes the third rotation element of the first planetary gear set PGS1, and the first sun gear S1 constitutes the fourth rotation element of the first planetary gear set PGS1.

The rotation elements of the second planetary gear set PGS2 include a third sun gear S3, a fourth sun gear S4, third and fourth carriers C3 and C4, and third and fourth ring gears R3 and R4. The fourth sun gear S4 constitutes the first rotation element of the second planetary gear set PGS2, the third and fourth ring gears R3 and R4 constitute the second rotation element of the second planetary gear set PGS2, the third and fourth carriers C3 and C4 constitute the third rotation element of the second planetary gear set PGS2, and the third sun gear S3 constitutes the fourth rotation element of the second planetary gear set PGS2. Thus, the second planetary gear set PGS2 as described above has substantially a structure of a Ravigneaux type planetary gear train.

FIG. 10 shows an operation mode table of various embodiments configured as described above.

Figure 11:
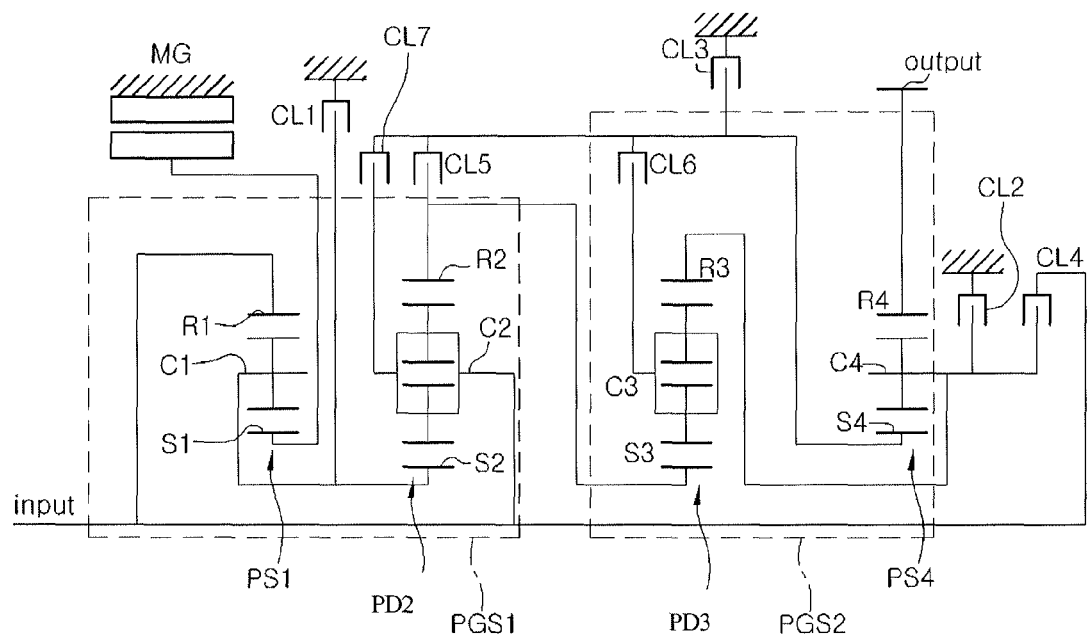
FIG. 11 illustrates an exemplary transmission according to the present application.
Figure 12:
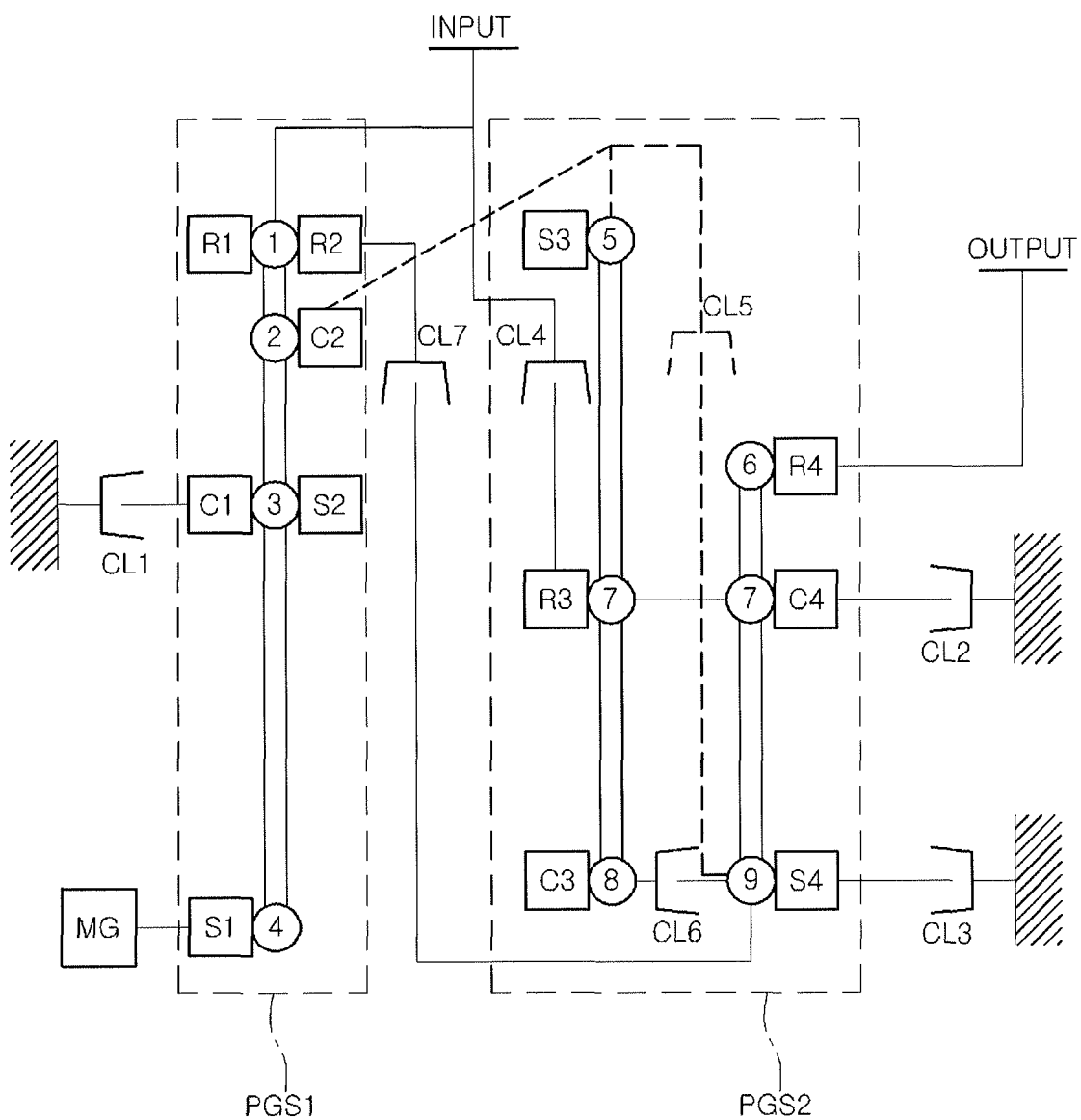
FIG. 12 depicts the hybrid transmission of FIG. 11 as a lever diagram.

In addition to the common configuration as described above, various embodiments have other features as shown in FIGS. 11 and 12. For example, a first rotation element of the second planetary gear set PGS2 is normally or selectively connected to the second rotation element of the first planetary gear set PGS1 and selectively connected to a fifth rotation element of the second planetary gear set PGS2 via a fifth clutch CL5. A second rotation element of the second planetary gear set PGS2 is normally or selectively connected to the output element OUTPUT. A third rotation element of the second planetary gear set PGS2 is selectively connected to the input element INPUT and the transmission case via a fourth clutch CL4 and a second clutch CL2. A fourth rotation element of the second planetary gear set PGS2 is selectively connected to the fifth rotation element of the second planetary gear set PGS2 via a sixth clutch CL6. And a fifth rotation element of the second planetary gear set PGS2 is selectively connected to the first rotation element of the first planetary gear set PGS1 via a seventh clutch CL7, the first rotation element of the second planetary gear set PGS2 via the fifth clutch CL5, the fourth rotation element of the second planetary gear set PGS2 via the sixth clutch CL6, and the transmission case via a third clutch CL3. Here, the first rotation element of the first planetary gear set PGS1 is selectively connected to the input element INPUT and the first rotation element of the second planetary gear set PGS2 is selectively connected to the second rotation element of the first planetary gear set PGS1.

The first planetary gear set PGS1 is constituted by combining a first single pinion planetary gear train PS1 and a second double pinion planetary gear train PD2. Rotation elements of the first single pinion planetary gear train PS1 include a first sun gear S1, a first carrier C1, and a first ring gear R1, and rotation elements of the second double pinion planetary gear train PD2 include a second sun gear S2, a second carrier C2, and a second ring gear R2. The first ring gear R1 is normally or selectively connected to the second carrier C2 and constitutes the first rotation element of the first planetary gear set PGS1, the second ring gear R2 constitutes the second rotation element of the first planetary gear set PGS1, the first carrier C1 is normally or selectively connected to the second sun gear S2 and constitutes the third rotation element of the first planetary gear set PGS1, and the first sun gear S1 constitutes the fourth rotation element of the first planetary gear set PGS1.

The second planetary gear set PGS2 is constituted by combining a third double pinion planetary gear train PD3 and a fourth single pinion planetary gear train PS4. Rotation elements of the third double pinion planetary gear train PD3 include a third sun gear S3, a third carrier C3, and a third ring gear R3, and rotation elements of the fourth single pinion planetary gear train PS4 include a fourth sun gear S4, a fourth carrier C4, and a fourth ring gear R4. The third sun gear S3 constitutes the first rotation element of the second planetary gear set PGS2, the fourth ring gear R4 constitutes the second rotation element of the second planetary gear set PGS2, the third ring gear R3 is normally or selectively connected to the fourth carrier C4 and constitutes the third rotation element of the second planetary gear set PGS2, the third carrier C3 constitutes the fourth rotation element of the second planetary gear set PGS2, and the fourth sun gear S4 constitutes the fifth rotation element of the second planetary gear set PGS2.

FIG. 13 shows an operation mode table of various embodiments configured as described above.

Figure 14:
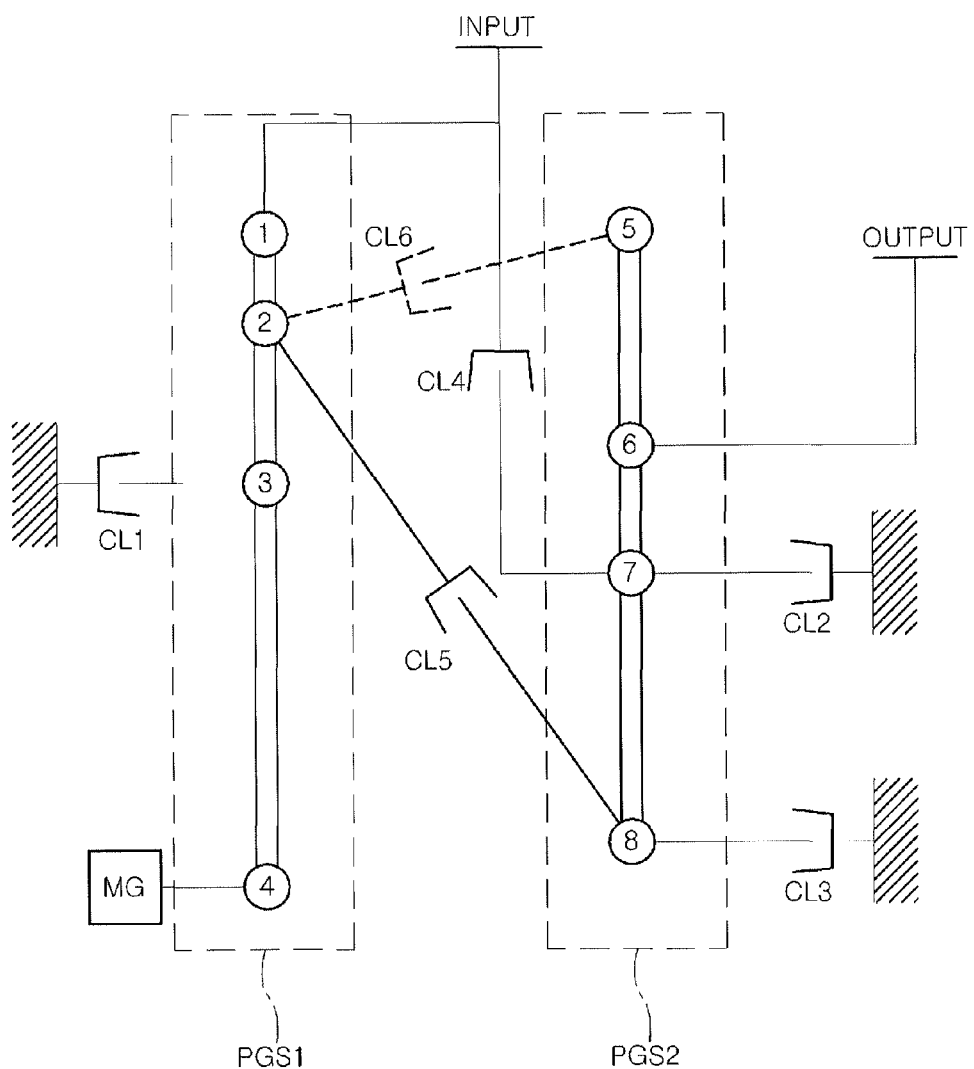
FIG. 14 is a level diagram schematically illustrating various aspects of the present application.

Now, operations of various embodiments according to the present application configured as described above will be described using lever diagrams shown in FIGS. 14-24. The lever diagram in FIG. 14 represents some embodiments, and level diagrams of other embodiments are similar to the lever diagram in FIG. 14. Accordingly, the operations will be described based on the lever diagram shown in FIG. 14 and with reference to FIGS. 15 to 24.

Reference numerals 1 to 4 as indicated in FIG. 14 designate the first to fourth rotation elements of the first planetary gear set PGS1 respectively, whereas reference numerals 5 to 8 designate the first to fourth rotation elements of the second planetary gear set PGS2 respectively. Thus, the following description with respect to the operations thereof will be described with the reference numerals indicated in FIG. 14.

Figure 15:
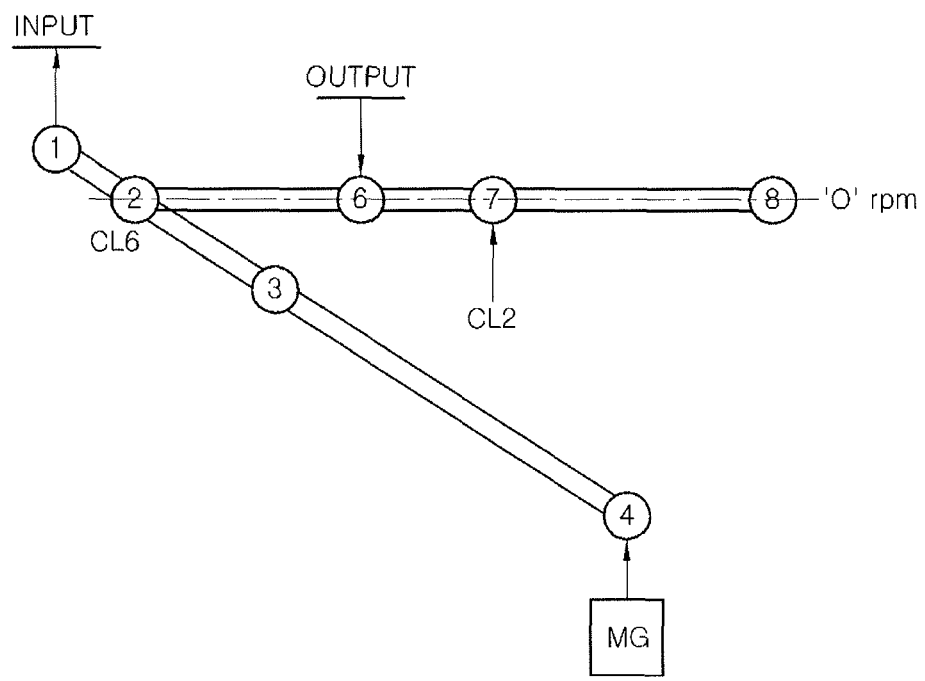
FIGS. 15 to 17 are level diagrams schematically illustrating starting states of a vehicle according to various aspects of the present application.
Figure 16:
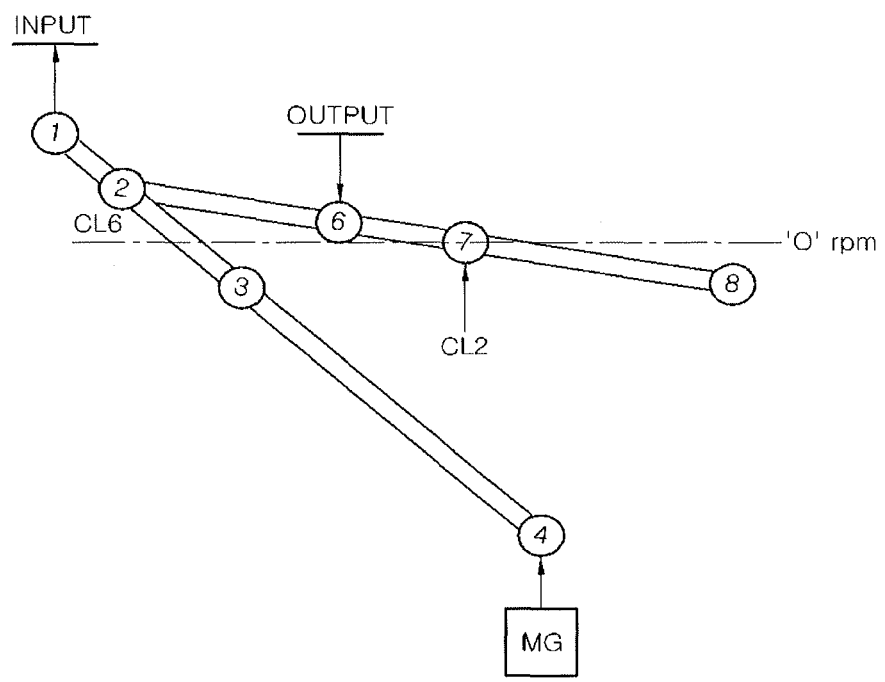
Figure 17:
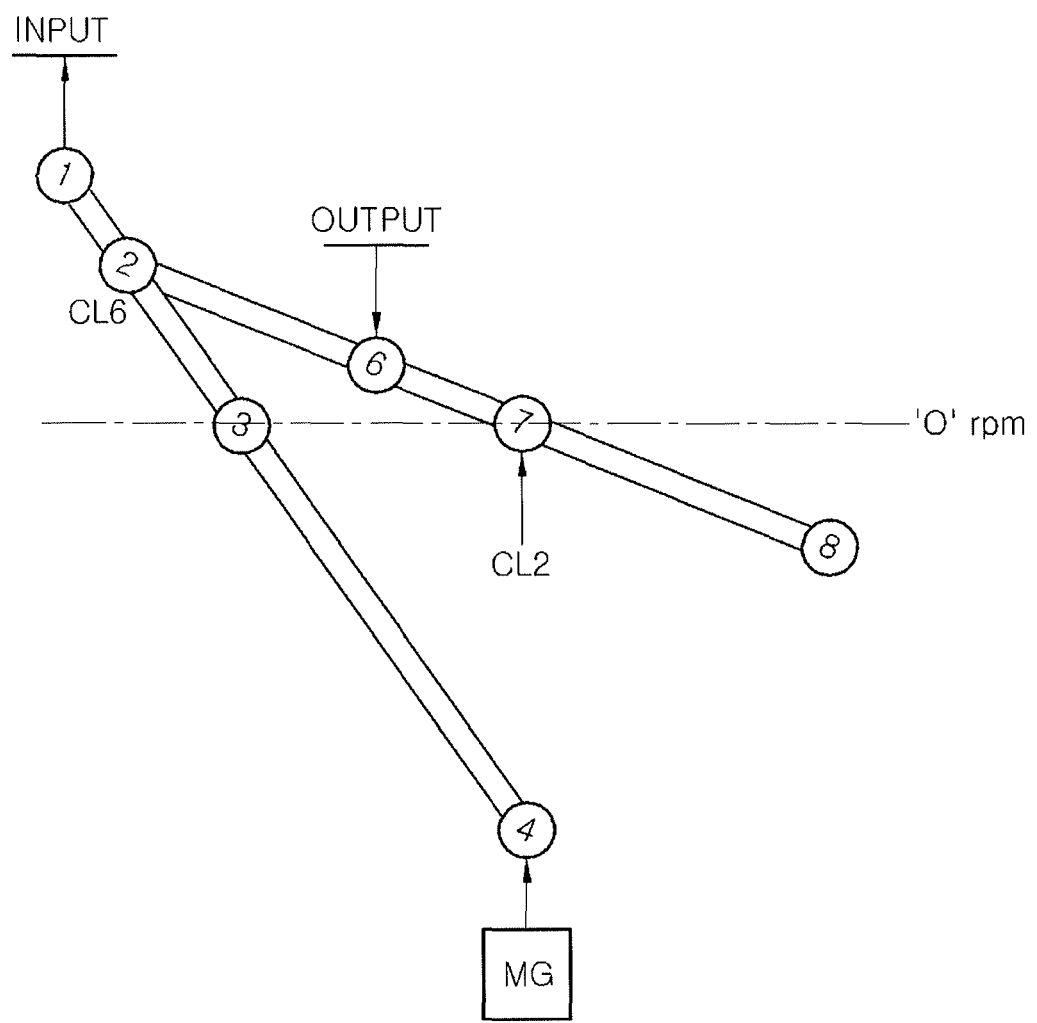

FIGS. 15 to 17 show states of a vehicle when it starts. FIG. 15 shows an initial state in which a vehicle speed is 0 km/h, and FIGS. 16 and 17 show states in which the vehicle speed is gradually increasing.

Firstly, referring to FIG. 15, the input element INPUT is connected to an engine, and thus the input element INPUT is rotated by a power of the engine. At this time, since the second clutch CL2 is activated and the vehicle speed is 0 km/h, the rotation elements 5, 6, 7, and 8 are stopped. In addition, the sixth clutch CL6 is activated, and thus the rotation element 2 is stopped together with the rotation element 5. As a result, the rotation elements 3 and 4 are rotated at a negative (−) RPM value, and a motive torque is transferred to the output element OUTPUT by a torque control of the motor/generator MG.

When the rotation element 6 begins to rotate, the rotation element 7 is stopped by activation of the second clutch CL2 as shown in FIG. 16. Based on this condition, rotation speeds of the rotation elements 5 and 8 are determined. Also, the rotation element 2 is rotated at the same speed as that of the rotation element 5 by activation of the sixth clutch CL6. In this course, a torque of the engine and a torque of the motor/generator MG are combined such that a driving torque continues to be transferred to the output element OUTPUT, thereby maintaining a smooth start.

When the vehicle speed reaches a certain level, a control is performed to embody a fixed-gear stage as a D1 gear stage, in which the torque control of the motor/generator MG is performed such that the rotation speed of the rotation element 3 can become "0" (see FIG. 17).

Figure 18:
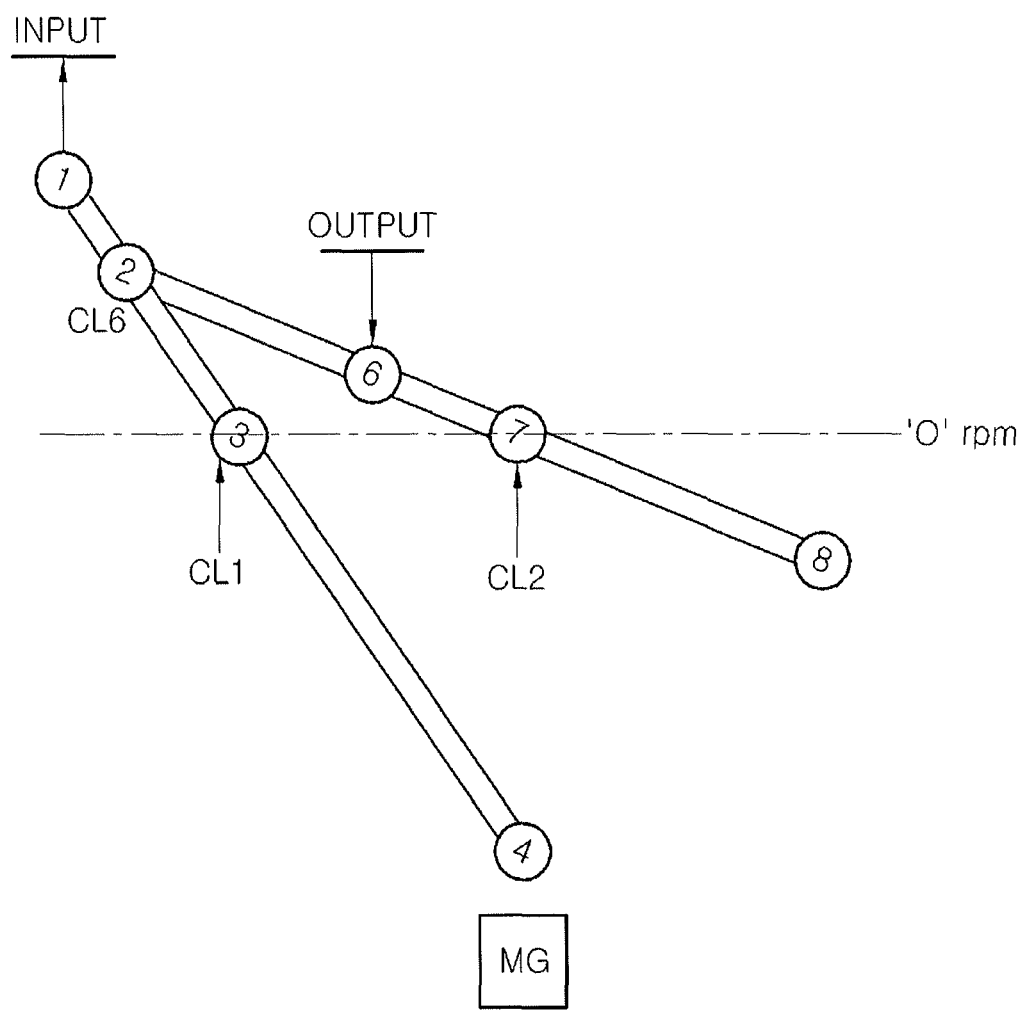
FIG. 18 illustrates a state embodying a D1 gear stage according to various aspects of the present application.

As shown in FIG. 18, when the rotation speed of the rotation element 3 approaches "0," the first clutch CL1 is activated, and then the torque of the motor/generator MG is removed, thereby embodying the fixed-gear stage as the D1 gear stage.

When an additional acceleration is required after the fixed-gear stage as the D1 gear stage is embodied, the motor/generator MG supplies a negative (−) torque, and thus the vehicle is driven in a torque assistance mode in which a driving power much higher than those of the D1 gear stage can be transferred to the output element OUTPUT.

If a braking force is required in the D1 gear stage, a driving power of the engine may be reduced or eliminated, and then a positive (+) torque may be applied to the motor/generator MG, thereby performing a control for reducing the vehicle speed. Such a positive (+) torque control enables an electricity generation control in which the electricity is generated depending on power flows in the motor/generator MG.

Therefore, the braking energy can be recovered as electricity, thereby enhancing the fuel efficiency of the vehicle. Also, as seen from FIG. 18, the rotation speed of the motor/generator MG is in a negative (−) direction and the magnitude thereof can be realized differently from the engine speed. Thus, the rotation speed of the motor/generator MG can be set higher than a common engine speed such that the motor/generator MG can be further operated in the vicinity of the optimal efficiency operating point of the motor/generator MG, thereby enhancing electricity generation efficiency.

Figure 19:
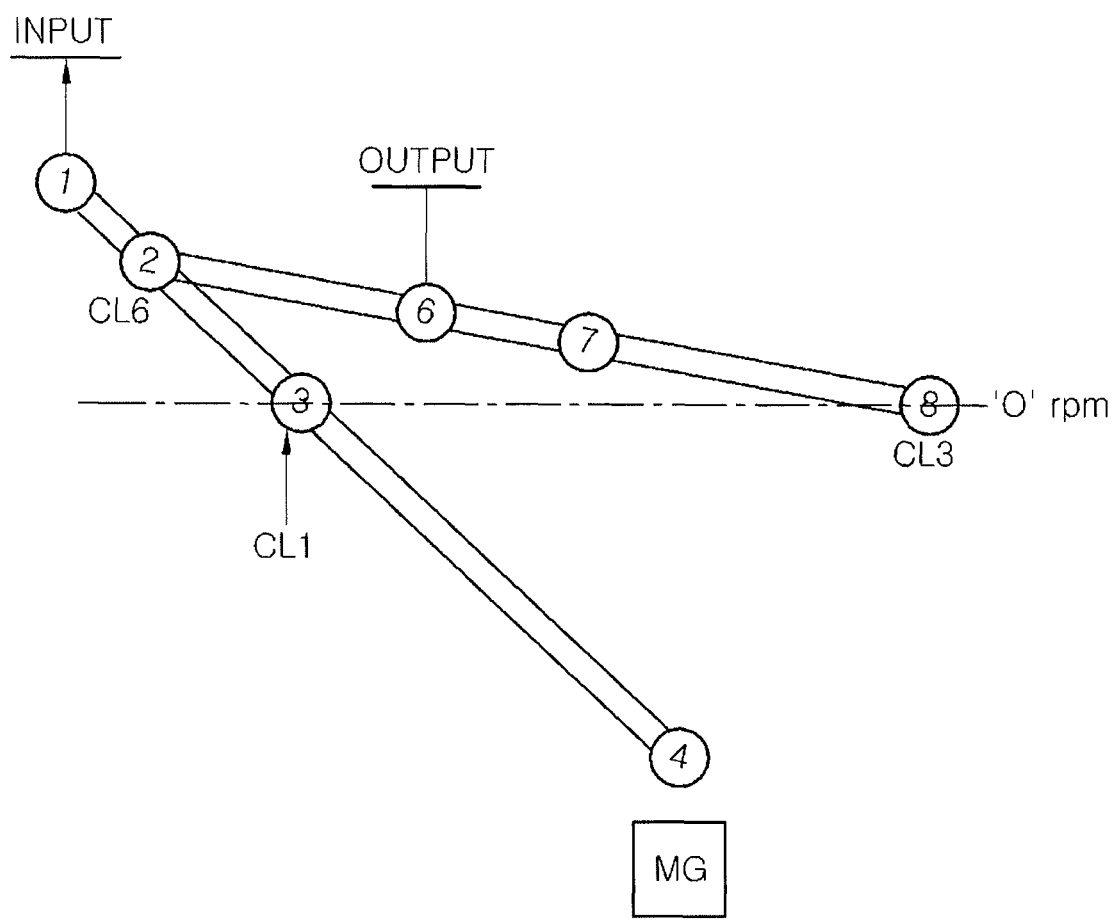
FIG. 19 illustrates a state embodying a D2 gear stage according to various aspects of the present application.
Figure 20:
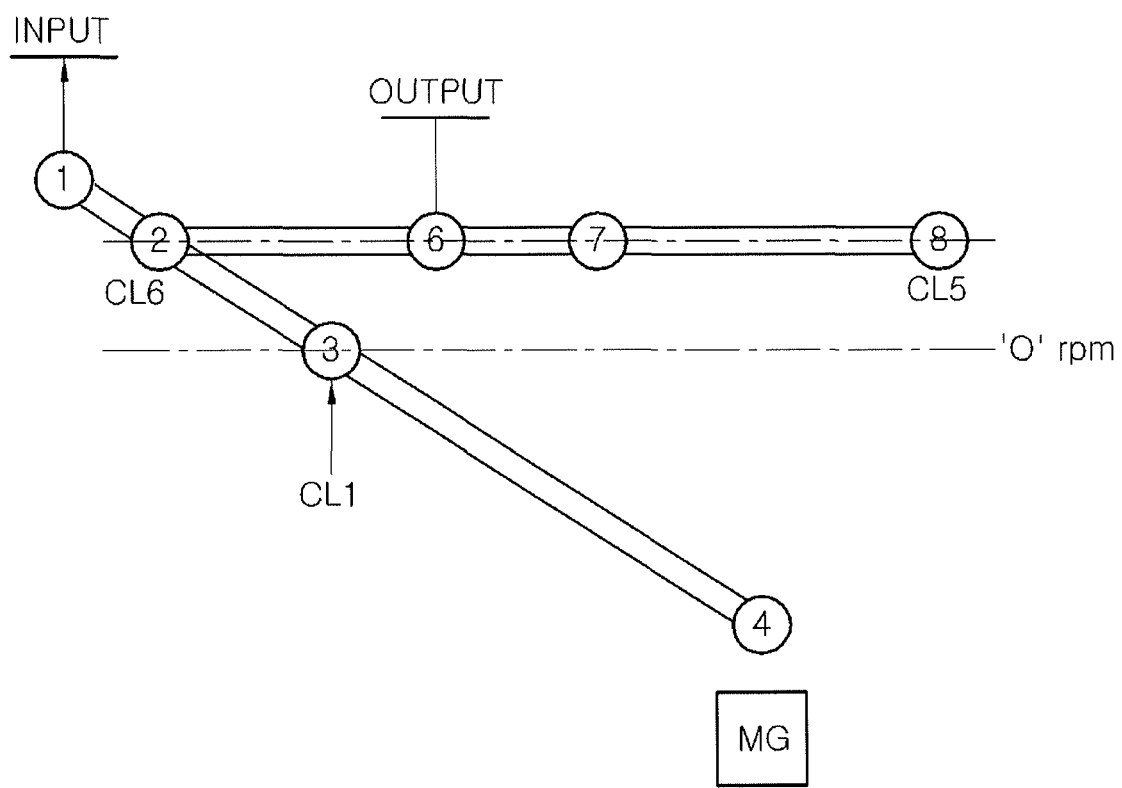
FIG. 20 illustrates a state embodying a D3 gear stage according to various aspects of the present application.

FIG. 19 shows a state in which a D2 gear stage is embodied. In this state, the first clutch CL1, the third clutch CL3, and the sixth clutch CL6 are activated. FIG. 20 shows a state in which a D3 gear stage is embodied. Here, the first clutch CL1, the fifth clutch CL5, and the sixth clutch CL6 are activated, such that the second planetary gear set PGS2 has essentially the same speed as that of the rotation element 2 and outputs the corresponding power to the output element OUTPUT.

Figure 21:
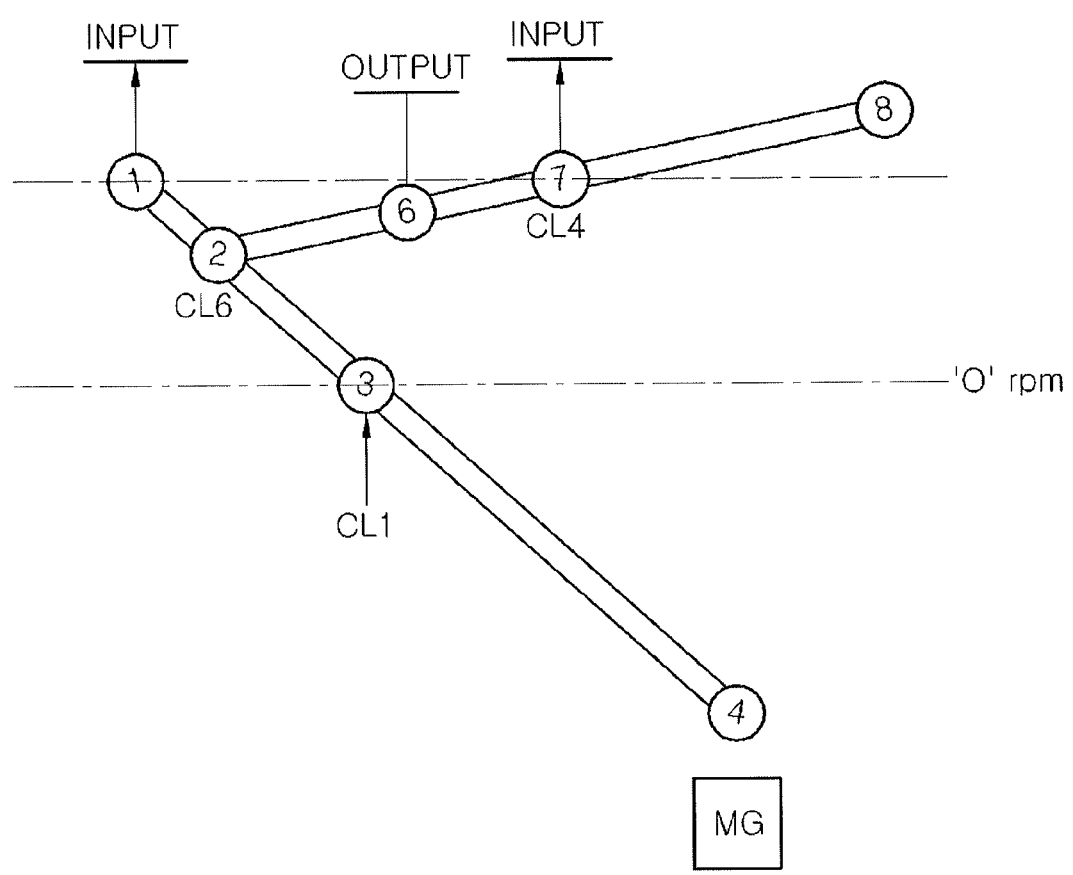
FIG. 21 illustrates a state embodying a D4 gear stage according to various aspects of the present application.

In FIG. 21 showing a state in which a D4 gear stage is embodied, the first clutch CL1, the fourth clutch CL4, and the sixth clutch CL6 are activated. Therefore, a power of the input element INPUT is intactly transferred to the rotation element 7 via the fourth clutch CL4 and then the rotation speed is reduced corresponding to a gear ratio of the second planetary gear set PGS2. The corresponding power is outputted to the output element OUTPUT via the rotation element 6.

Figure 22:
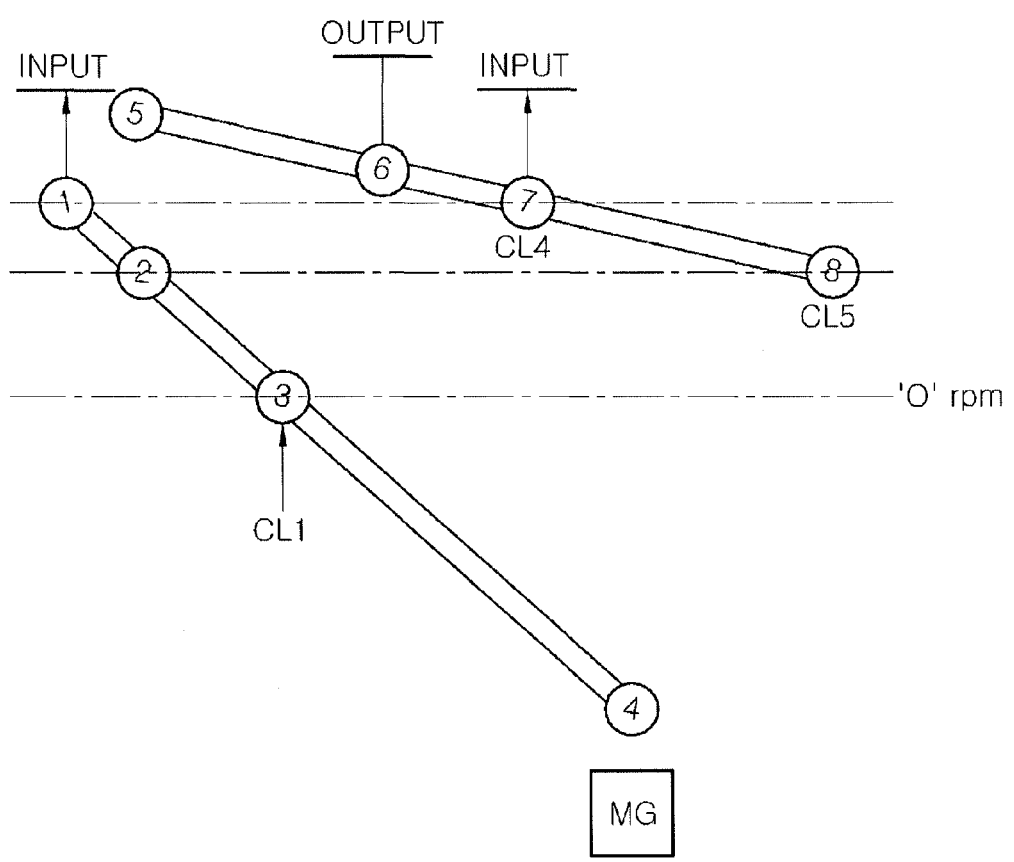
FIG. 22 illustrates a state embodying a D5 gear stage according to various aspects of the present application.

FIG. 22 shows a state in which a D5 gear stage is embodied. Here, the first clutch CL1, the fourth clutch CL4, and the fifth clutch CL5 are activated, whereas the second clutch CL2 is released. In this state, the input element INPUT is rotated together with the rotation elements 1 and 7, and the rotation element 8 is constrained to the rotation element 2 by the fifth clutch CL5, such that a power in which a rotation speed is increased corresponding to the gear ratio of the second planetary gear set PGS2 is outputted via the rotation element 6.

Figure 23:
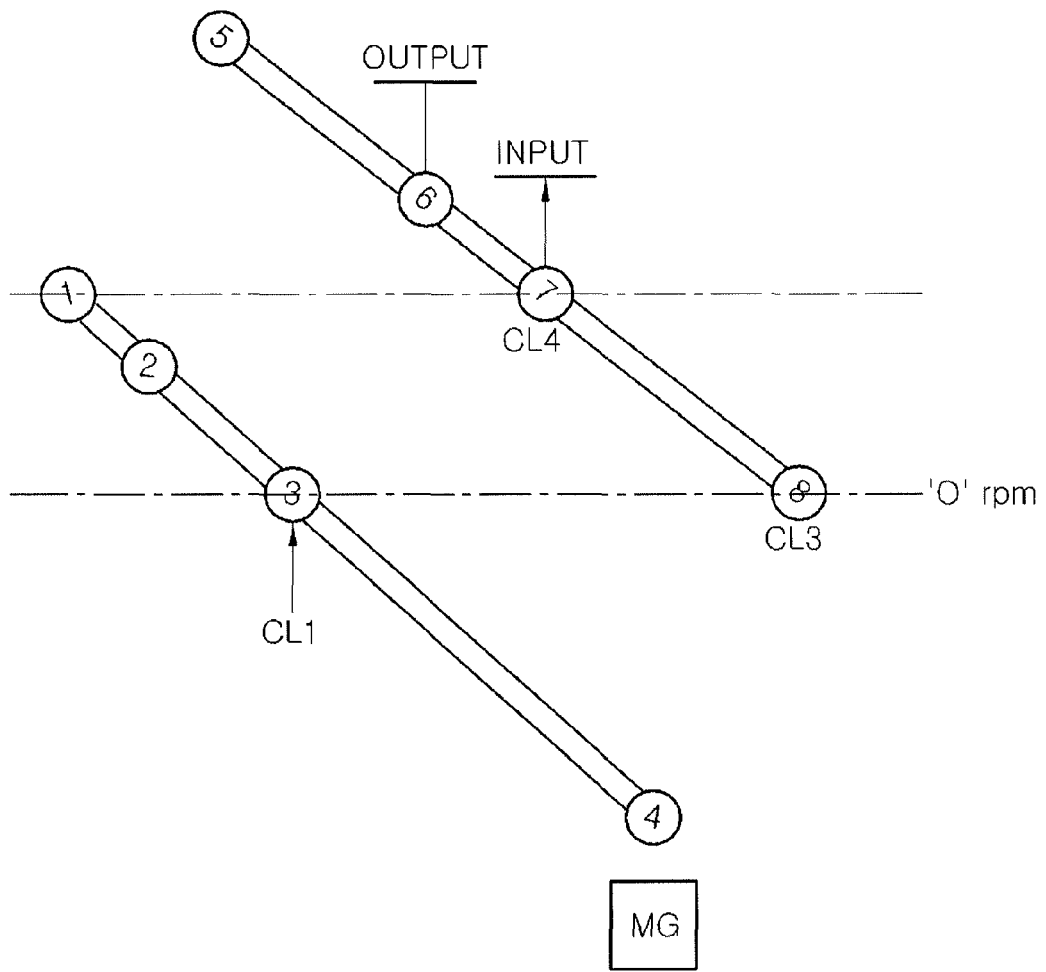
FIG. 23 illustrates a state embodying a D6 gear stage according to various aspects of the present application.

FIG. 23 shows a state in which a D6 gear stage is embodied. The first clutch CL1, the third clutch CL3, and the fourth clutch CL4 are activated, and thus the rotation element 8 is fixed by the third clutch. In this state, when a power of the input element INPUT is supplied to the second planetary gear set PGS2 via the fourth clutch CL4, the power in which a rotation speed is increased corresponding to the gear ratio of the second planetary gear set PGS2 can be outputted via the rotation element 6.

Figure 24:
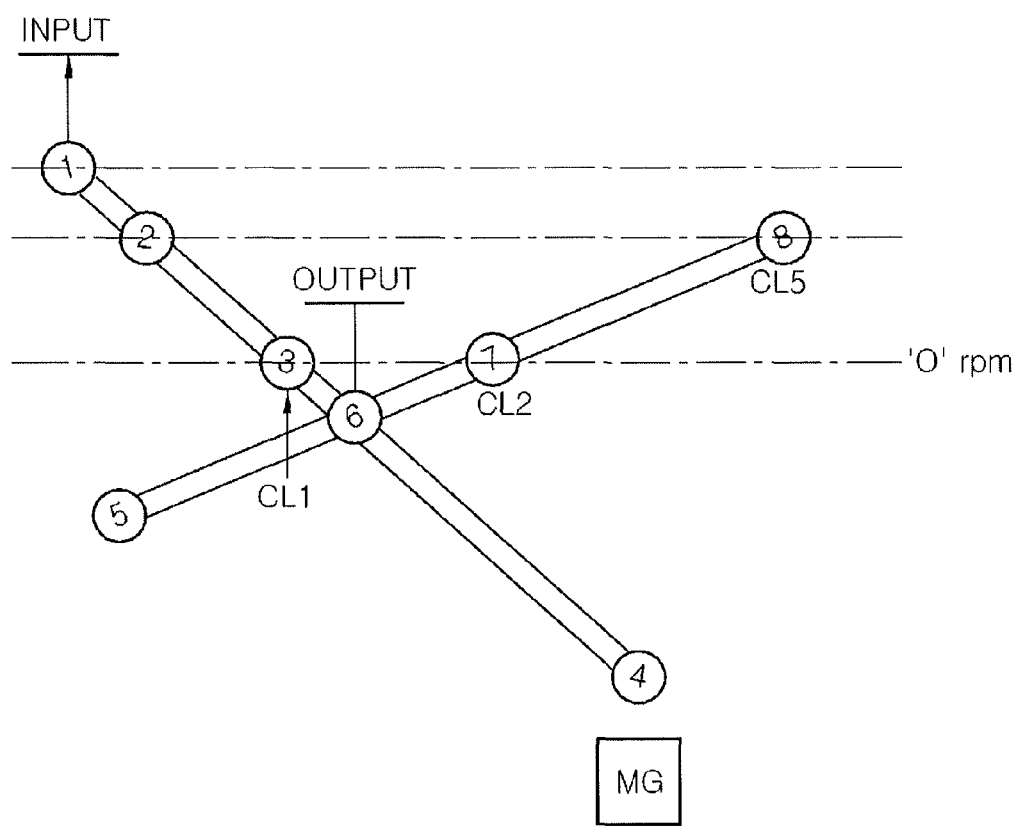
FIG. 24 illustrates a state embodying a reverse gear stage according to various aspects of the present application.

FIG. 24 shows a state in which an R gear stage, i.e., a reverse gear stage, is embodied. Here, the first clutch CL1, the second clutch CL2, and the fifth clutch CL5 are activated and thus the rotation element 7 is fixed by the second clutch CL2. In this state, a rotation force of the rotation element reduced by the first planetary gear set PGS1 is transferred to the rotation element 8 via the fifth clutch CL5. Thus, the rotation element 6 of the second planetary gear set PGS2 outputs a reverse rotation force to the output element OUTPUT.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. A hybrid transmission, comprising:
a first planetary gear set (PGS1) constituted of a complex planetary gear train connected to an input element (INPUT), a motor/generator (MG), and a first clutch (CL1), and having four or more rotation elements; and
a second planetary gear set (PGS2) connected to an output element (OUTPUT) and having four or more rotation elements,
wherein a first rotation element of the first planetary gear set (PGS1) is connected to the input element (INPUT),
the first clutch (CL1) is installed to selectively stop rotation of a third rotation element of the first planetary gear set (PGS1), and
a fourth rotation element of the first planetary gear set (PGS1) is connected to the motor/generator (MG),
wherein the third rotation element and the fourth rotation element are different rotation elements.

2. The hybrid transmission according to claim 1, wherein a second rotation element of the first planetary gear set (PGS1) is selectively connected to two or more rotation elements of the second planetary gear set (PGS2) that are constantly connected to the output element (OUTPUT).

3. The hybrid transmission according to claim 1, wherein a second rotation element of the first planetary gear set (PGS1) is selectively connected via clutches to two or more rotation elements of the second planetary gear set (PGS2) that are constantly connected to the output element (OUTPUT).

4. The hybrid transmission according to claim 1, wherein a first rotation element of the second planetary gear set (PGS2) is selectively connected to a second rotation element of the first planetary gear set (PGS1) via a sixth clutch (CL6);
a second rotation element of the second planetary gear set (PGS2) is constantly connected to the output element (OUTPUT);
a third rotation element of the second planetary gear set (PGS2) is selectively connected to the input element (INPUT) and a transmission case via a fourth clutch (CL4) and a second clutch (CL2); and
a fourth rotation element of the second planetary gear set (PGS2) is selectively connected to the second rotation element of the first planetary gear set (PGS1) and the transmission case via a fifth clutch (CL5) and a third clutch (CL3).

5. The hybrid transmission according to claim 4, wherein the first planetary gear set (PGS1) is constituted by combining a first single pinion planetary gear train (PS1) and a second single pinion planetary gear train (PS2);
rotation elements of the first single pinion planetary gear train (PS1) include a first sun gear (S1), a first carrier (C1), and a first ring gear (R1);
rotation elements of the second single pinion planetary gear train (PS2) include a second sun gear (S2), a second carrier (C2), and a second ring gear (R2);
the second ring gear (R2) constitutes the first rotation element of the first planetary gear set (PGS1);
the first ring gear (R1) is selectively connected to the second carrier (C2) and constitutes the second rotation element of the first planetary gear set (PGS1);
the first carrier (C1) is selectively connected to the second sun gear (S2) and constitutes the third rotation element of the first planetary gear set (PGS1); and
the first sun gear (S1) constitutes the fourth rotation element of the first planetary gear set (PGS1).

6. The hybrid transmission according to claim 5, wherein the rotation elements of the second planetary gear set (PGS2) include a third sun gear (S3), a fourth sun gear (S4), third and fourth carriers (C3, C4), and third and fourth ring gears (R3, R4);
the fourth sun gear (S4) constitutes the first rotation element of the second planetary gear set (PGS2);
the third and fourth ring gears (R3, R4) constitute the second rotation element of the second planetary gear set (PGS2);
the third and fourth carriers (C3, C4) constitute the third rotation element of the second planetary gear set (PGS2); and the third sun gear (S3) constitutes the fourth rotation element of the second planetary gear set (PGS2).

7. The hybrid transmission according to claim 4, wherein the first planetary gear set (PGS1) is constituted by combining a first single pinion planetary gear train (PS1) and a second single pinion planetary gear train (PS2);
rotation elements of the first single pinion planetary gear train (PS1) include a first sun gear (S1), a first carrier (C1), and a first ring gear (R1);
rotation elements of the second single pinion planetary gear train (PS2) include a second sun gear (S2), a second carrier (C2), and a second ring gear (R2);
the first ring gear (R1) is selectively connected to the second ring gear (R2) and constitutes the first rotation element of the first planetary gear set (PGS1);
the second carrier (C2) constitutes the second rotation element of the first planetary gear set (PGS1);
the first carrier (C1) is selectively connected to the second sun gear (S2) and constitutes the third rotation element of the first planetary gear set (PGS1); and
the first sun gear (S1) constitutes the fourth rotation element of the first planetary gear set (PGS1).

8. The hybrid transmission according to claim 7, wherein the rotation elements of the second planetary gear set (PGS2) include a third sun gear (S3), a fourth sun gear (S4), third and fourth carriers (C3, C4), and third and fourth ring gears (R3, R4);
the fourth sun gear (S4) constitutes the first rotation element of the second planetary gear set (PGS2);
the third and fourth ring gears (R3, R4) constitute the second rotation element of the second planetary gear set (PGS2);
the third and fourth carriers (C3, C4) constitute the third rotation element of the second planetary gear set (PGS2); and
the third sun gear (S3) constitutes the fourth rotation element of the second planetary gear set (PGS2).

9. The hybrid transmission according to claim 1, wherein a first rotation element of the second planetary gear set (PGS2) is selectively connected to a second rotation element of the first planetary gear set (PGS1) via a sixth clutch (CL6);
a second rotation element of the second planetary gear set (PGS2) is selectively connected to the output element (OUTPUT);
a third rotation element of the second planetary gear set (PGS2) is selectively connected to the input element (INPUT) and a transmission case via a fourth clutch (CL4) and a second clutch (CL2); and
a fourth rotation element of the second planetary gear set (PGS2) is selectively connected to the input element (INPUT), the second rotation element of the first planetary gear set (PGS1), and the transmission case, via a seventh clutch (CL7), a fifth clutch (CL5), and a third clutch (CL3).

10. The hybrid transmission according to claim 9, wherein the first planetary gear set (PGS1) is constituted by combining a first single pinion planetary gear train (PS1) and a second double pinion planetary gear train (PD2);
rotation elements of the first single pinion planetary gear train (PS1) include a first sun gear (S1), a first carrier (C1), and a first ring gear (R1);
rotation elements of the second double pinion planetary gear train (PD2) include a second sun gear (S2), a second carrier (C2), and a second ring gear (R2);
the first ring gear (R1) is selectively connected to the second carrier (C2) and constitutes the first rotation element of the first planetary gear set (PGS1);
the second ring gear (R2) constitutes the second rotation element of the first planetary gear set (PGS1);
the first carrier (C1) is selectively connected to the second sun gear (S2) and constitutes the third rotation element of the first planetary gear set (PGS1); and
the first sun gear (S1) constitutes the fourth rotation element of the first planetary gear set (PGS1).

11. The hybrid transmission according to claim 10, wherein the rotation elements of the second planetary gear set (PGS2) include a third sun gear (S3), a fourth sun gear (S4), third and fourth carriers (C3, C4), and third and fourth ring gears (R3, R4);
the fourth sun gear (S4) constitutes the first rotation element of the second planetary gear set (PGS2);
the third and fourth ring gears (R3, R4) constitute the second rotation element of the second planetary gear set (PGS2);
the third and fourth carriers (C3, C4) constitute the third rotation element of the second planetary gear set (PGS2); and
the third sun gear (S3) constitutes the fourth rotation element of the second planetary gear set (PGS2).

12. The hybrid transmission according to claim 1, wherein a first rotation element of the second planetary gear set (PGS2) is selectively connected to a second rotation element of the first planetary gear set (PGS1) and selectively connected to a fifth rotation element of the second planetary gear set (PGS2) via a fifth clutch (CL5);
a second rotation element of the second planetary gear set (PGS2) is selectively connected to the output element (OUTPUT);
a third rotation element of the second planetary gear set (PGS2) is selectively connected to the input element (INPUT) and a transmission case via a fourth clutch (CL4) and a second clutch (CL2);
a fourth rotation element of the second planetary gear set (PGS2) is selectively connected to the fifth rotation element of the second planetary gear set (PGS2) via a sixth clutch (CL6); and
a fifth rotation element of the second planetary gear set (PGS2) is selectively connected to the first rotation element of the first planetary gear set (PGS1) via a seventh clutch (CL7), the first rotation element of the second planetary gear set (PGS2) via the fifth clutch (CL5), the fourth rotation element of the second planetary gear set (PGS2) via the sixth clutch (CL6), and the transmission case via a third clutch (CL3),
wherein the first rotation element of the first planetary gear set (PGS1) is selectively connected to the input element (INPUT) and the first rotation element of the second planetary gear set (PGS2) is selectively connected to the second rotation element of the first planetary gear set (PGS1).

13. The hybrid transmission according to claim 12, wherein the first planetary gear set (PGS1) is constituted by combining a first single pinion planetary gear train (PS1) and a second double pinion planetary gear train (PD2);
rotation elements of the first single pinion planetary gear train (PS1) include a first sun gear (S1), a first carrier (C1), and a first ring gear (R1);
rotation elements of the second double pinion planetary gear train (PD2) include a second sun gear (S2), a second carrier (C2), and a second ring gear (R2);
the first ring gear (R1) is selectively connected to the second carrier (C2) and constitutes the first rotation element of the first planetary gear set (PGS1);

the second ring gear (R2) constitutes the second rotation element of the first planetary gear set (PGS1);

the first carrier (C1) is selectively connected to the second sun gear (S2) and constitutes the third rotation element of the first planetary gear set (PGS1); and the first sun gear (S1) constitutes the fourth rotation element of the first planetary gear set (PGS1).

14. The hybrid transmission according to claim 13, wherein the second planetary gear set (PGS2) is constituted by combining a third double pinion planetary gear train (PD3) and a fourth single pinion planetary gear train (PS4);

rotation elements of the third double pinion planetary gear train (PD3) include a third sun gear (S3), a third carrier (C3), and a third ring gear (R3);

rotation elements of the fourth single pinion planetary gear train (PS4) include a fourth sun gear (S4), a fourth carrier (C4), and a fourth ring gear (R4);

the third sun gear (S3) constitutes the first rotation element of the second planetary gear set (PGS2);

the fourth ring gear (R4) constitutes the second rotation element of the second planetary gear set (PGS2);

the third ring gear (R3) is selectively connected to the fourth carrier (C4) and constitutes the third rotation element of the second planetary gear set (PGS2);

the third carrier (C3) constitutes the fourth rotation element of the second planetary gear set (PGS2); and the fourth sun gear (S4) constitutes the fifth rotation element of the second planetary gear set (PGS2).

* * * * *